March 19, 1929.　　　G. GRIFFITH　　　1,705,760
STEREOSCOPIC COLOR CINEMATOGRAPHIC APPARATUS
Filed April 13, 1926
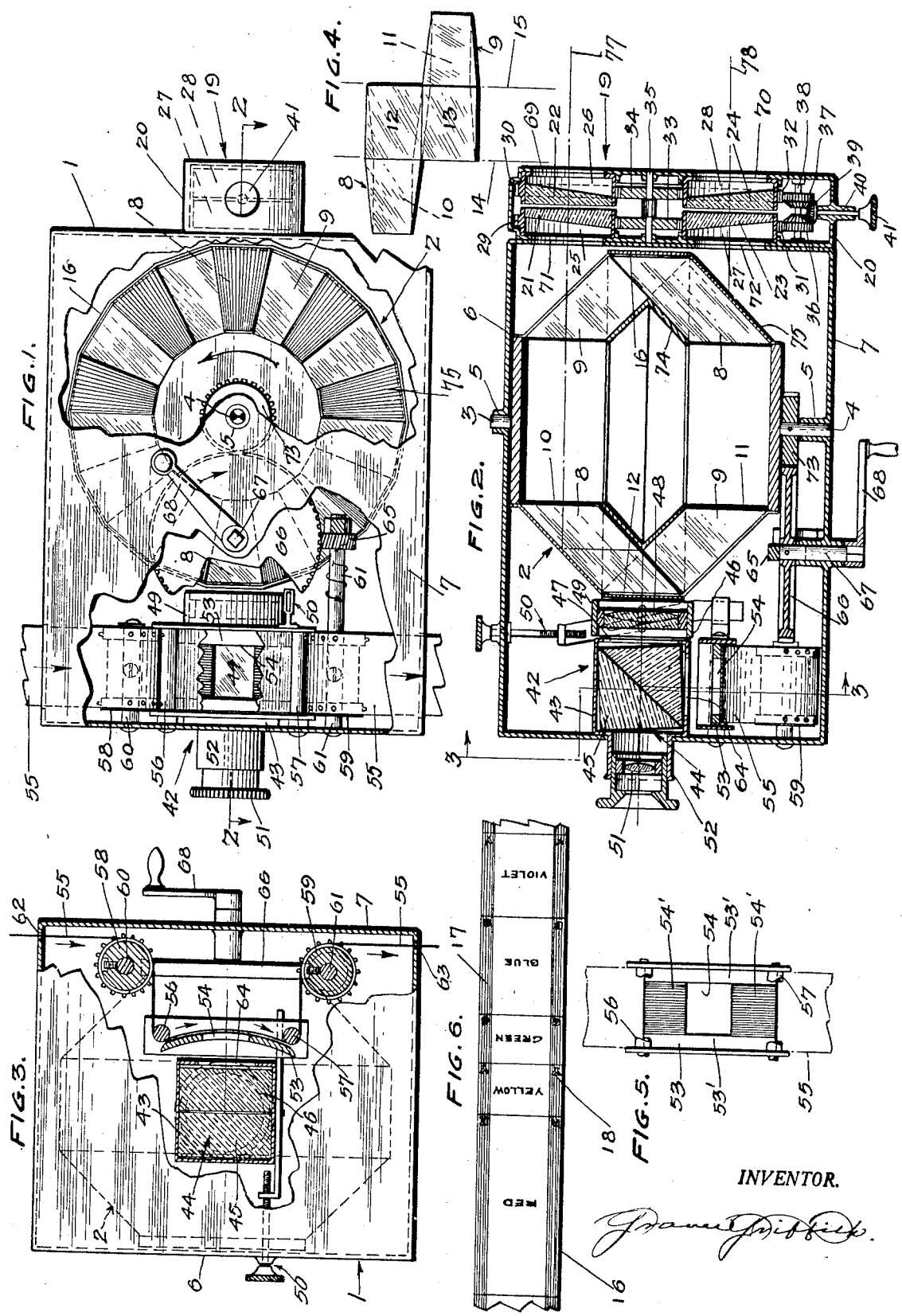
INVENTOR.
James Griffith.

Patented Mar. 19, 1929.

1,705,760

UNITED STATES PATENT OFFICE.

GRAVES GRIFFITH, OF SAN FRANCISCO, CALIFORNIA.

STEREOSCOPIC COLOR CINEMATOGRAPHIC APPARATUS.

Application filed April 13, 1926. Serial No. 101,666.

The present invention relates to an improved cinematographic apparatus adapted for the taking or projection of stereoscopic pictures in colors.

The invention has as its primary object the provision of a cinematographic apparatus of a character whereby stereoscopic pictures in colors may be produced upon or reproduced from a continuously and uniformly moving film without necessitating the interception of the light by a shutter or like device.

A further object of the invention is the provision of means for dividing the beams of light, either before or after passage through the objective, for the creation of two identical image fields, one for photographic purposes and the other, under magnification, for "view-finding" and the vertical alignment of the successive image fields, as presented alternately by the revoluble light-reflecting system.

In addition to the foregoing is that of making improvements and refinements in my photographic and projecting instrument, for which Patent No. 1,556,216 was granted me October the 6th, 1925.

With these and other objects in view, the invention consists of certain novel improvements and combination of elements and parts, all of which will be hereinafter more fully described, and chief of which are: an adjustable initial ray-receiving system constituted of spaced refractive elements; a revoluble light-reflecting system consisting of a plurality of oppositely disposed and contiguously and annularly arranged rhomboidal reflective elements; a ray-filter disposed about and borne by the revoluble reflective system and comprising a transparent zone bearing the spectrum colors in normal sequence and proportional dispersive areas; a fixed optical system constituted of an adjustable objective and a light-dividing prism combination; a film-feeding and film-guiding means; and a compensating driving mechanism co-operatively actuating both the revoluble reflecting system and the film-feeding means.

In the accompanying drawings, forming a part of this specification, and in which like parts are designated by similar reference characters, throughout:

Figure 1 is a side elevation of the apparatus, with a portion of the casing broken away, showing the revoluble reflecting system in elevation, the initial ray-receiving system, the film-feeding means and film-guide, and the gear-train for the actuation of the revoluble reflecting system;

Figure 2 is a horizontal sectional view, showing the alternate and opposed arrangement of the rhomboidal prism elements entering into the revoluble reflecting system construction, the means employed for securing and revolubly mounting the system, the light-dividing prism-combination, the film-feeding means, the gear-train for the actuation of the reflecting system and the film-feeding means, the ray-filter arrangement, the ocular, and the initial ray-receiving system, the section being indicated by the line 2—2, of Figure 1;

Figure 3 is a rear-end view, partly in section, taken on the offset line 3—3, of Figure 2, showing the light-dividing prism-combination element, objective focussing means, the film-guide, and the film sprockets;

Figure 4 is a rhomboidal reflective unit constituted of two rhomboidal prisms of opposite disposition, of the construction and form entering into the revoluble annularly and contiguously arranged reflecting system composition;

Figure 5 is a rear elevation of the film-guide, showing portions of the film-guide rollers, the exposure aperture, the opaque central sections lying upon either side of and framing the exposure aperture, and the transparent marginal strips affording areas through which the indicia carried by the color-screen may be recorded upon the film margin to mark color boundaries.

Figure 6 is a schematic plan view of a portion of the ray-filter, or color-screen, band surrounding and carried by the revoluble reflecting system, showing the sequential arrangement of the spectrum colors, with their proportionate areas as to dispersion, and the opaqued marginal boundaries carrying transparent indicia-bearing spaces for marking the boundaries of the different spectrum colors.

Referring more particularly to the drawings, in which has been shown in a general way an embodiment of my invention, 1 indicates a housing of light-impervious character and rectangular form having mounted therewithin a revoluble reflecting system 2 constituted of annularly arranged and oppositely disposed rhomboidal prism units carried by spindles 3 and 4 mounted in suitable bearings 5 formed in the housing sides 6 and 7, the revoluble system being constituted of an even number of rhomboidal prism elements, this number being of such character as to be resolvable into an odd number of pairs constituting reflective units, the prism elements of which 8 and 9 are of opposite disposition, Figures 2 and 4, and each so fashioned as to lie between two planes having an angular inclination toward each other of less than forty-five degress and their emergent faces at an angular inclination from each other of more than ninety degress and included between two vertical parallel planes 14 and 15, Figure 4.

In the present construction the total of these prisms is 18 and the number of pairs, or units, 9, requiring that the angular inclination of upper to lower surfaces of individual prisms be 20 degrees and that of an emergent face to an emergent face of a pair, or unit, be 160 degrees. It is observable in this connection that, in all instances, these angular conditions vary with requirements and are conditioned upon the number of prisms desired for a particular construction, but are, preferably, of an even number of which 360 is a multiple and that itself may be resolved into an odd number of pairs, as assembled, the entrant faces 10 and 11 of the units constituting the reflecting system are assumed as being of opposite disposition about the surface of an imaginary cylindrical body and the emergent faces as being confined within the subscribing surface of a second imaginary cylindrical body within which the former body is inscribed.

A transparent ray-filter, or color-screen, band 16 surrounds the reflecting system 2 and is secured thereto and borne thereby resting upon or contacting the emergent faces 12, 13 of this system, the band carrying color areas proportionate to the dispersive areas of the spectrum colors and arranged in sequence corresponding thereto, the normal spectrum being preferably selected. The marginal edges of the ray-filter, Figure 6, are provided with marginal opaqued borders 17 bearing transparent indicia 18 marking the boundaries of the different spectrum colors.

The initial ray-receiving system 19 lies in the horizontal plane of the apparatus and is housed in an extension 20 thereof, the system being constituted of two spaced pairs of refracting elements, each consisting of two wedge-shaped discs 21, 22 and 23, 24 having adjacent faces in parallelism, with the axes of the two pairs also parallel and at right angles, respectively, to said faces. The discs 21, 22 and 23, 24 constituting said pairs are mounted in adjacently arranged rings 25—26 and 27—28 held in revoluble position by means of flanged members carried by the housing 20, these rings being each provided with exteriorly arranged gear-teeth 29, 30 and 31, 32 adapted to mesh with a pair of pinions 33 and 34 loosely borne by the shaft 35, the gear-teeth 31, 32 of the rings 27, 28 being adapted to mesh with a pair of pinions 36 and 37 loosely mounted upon a shaft 38 in diametrical opposition to the pinions 33 and 34 and having bevelled faces adapted to mesh with a common bevel-pinion 39 carried by a stem 40 bearing a knurled knob 41 at its outer end, the said pinions being adapted to rotate the rings 27 and 28 in opposite directions relative to each other and also in like manner the rings 25 and 26, through the medium of the loose pinions 33 and 34.

The rear end of the apparatus is provided with an optical system 42 mounted in horizontal alignment with the axis of the reflecting system 2 and the initial ray-receiving system 19 and carried in a small housing 43 mounted within the housing 1. The system 42 comprises a light-dividing prism-combination element 44 constituted of two ninety-degree prisms 45 and 46 mounted hypothenusal face to hypothenusal face with an air-space therebetween, the said element being set at a slight departure from a vertical plane to meet the necessary requirements for the proper reflection and transmission of the light entering therein; an objective 48 carried in the mounting 49 and positioned between the revoluble reflecting rhomboidal system 2 and the light-dividing element 44 and in the plane of rotation of said revoluble rhomboidal system and provided with a focussing screw-adjustable means 50, there being provided an opening 47 for the transmission of light from the objective to the light-dividing element; and an ocular 51 adjustably mounted in the telescopic tube 52 in optical alignment with the objective 48 and adapted for the magnification of those images carried by the light-rays directly transmitted through the element 44.

The film-guide 53 is positioned adjacent to and opposite the light-dividing element 44 and in a plane at right-angles to the plane of the axis of rotation of the revoluble reflecting system 2, is of arcuate form, being an arc of a circle equal to or greater than the circle described by the revoluble system, and consists of a transparent material provided with a central exposure aperture 54 having adjacent opaque sections 54', as picture-framing elements, and marginal transparent strips 53', permitting light-passage for photographically recording upon the film margin the indicia borne by the ray-filter marking the boundaries of the different colors carried thereby, the exposure aperture serving to admit light directly to the film 55, which is drawn over the smooth outer surface of the guide by means of idlers 56 and 57 and film-sprockets 58 and 59 mounted upon horizontally positioned shafts 60 and 61, the film entering into and passing out of the housing through openings 62 and 63 from dispensing to receive reels, not shown.

The aperture 54 of the film-guide, constituting the exposure area, is positioned in alignment with the light-opening 64 formed in the light-dividing element housing 43, the film 55 being exposed to the light-rays as reflected by the element 44 while passing over this aperture.

The film-sprockets 58 and 59 are driven by means of the shaft 61 and skew-pinion 65 meshing with a skew-gear 66 mounted upon a shaft 67 borne by the housing 1 and bearing an operating crank 68 mounted upon its outer end about centrally of and upon the righthand side of the apparatus housing, these sprockets being so proportioned and geared as to give to film and images a common directional movement at equal velocities, while the revoluble reflecting system 2 is driven by means of a pinion 73 mounted upon its shaft 4 meshing with the skew-gear 66, the gear ratio here being such as to give to the film and to the light rays as finally reflected by the rotating rhomboidal prism units at their regularly constituted intervals an equal angular velocity.

The front of the main housing 1 is provided with a pair of spaced light-apertures 69 and 70 and a second aligned pair 71 and 72 adapted to admit light exteriorly from spaced points, through the refracting elements 21, 22 and 23, 24, to the revoluble reflecting system 2 for its alternate reception and transmission thereby to and through the optical system 19 to the film 55 and ocular 51.

The rhomboidal prism elements 8 and 9, constituting the system 2, are further reinforced and retained in perfect registration with each other by means of a centrally positioned skeleton frame 74 of a peripheral fashioning adapted to receive portions of the interior faces of these prism elements, and to which they are in like manner united, and providing alternately, as to opposite sides of the reflecting system 2, for an unobscured light-passage from front to rear on either side for prism functioning, and a frontal obscuration for the opposite side by a prism back, as indicated in Figures 1 and 2, with absence of a rear intervening prism for this side of the revoluble system, thus affording a means for the alternate functioning of the opposed sides of the revoluble reflecting system, the spider, including discs, also providing means for the support and carriage of the spindles 3 and 4.

Assuming conditions to be as indicated in Figures 1 and 2, the infinite rays 77 and 78 entering the apparatus are unaffected in passing through the refractive elements 21, 22 and 23, 24, the elements constituting each pair being in a position in which the refraction produced by the one is neutralized by the refraction in a contrary direction produced by the other, the rays passing from thence to the revoluble reflecting system. As illustrated, the left-hand side is presenting to the light-rays an unobstructed light-passage through to the rear to be received by a left positioned rhomboidal prism 8, through which it undergoes a double reflection, and from thence, in a course paralleling that of entrance, to and through the optical system 19 to be divided into two equal parts and directed, respectively, to two identical image-planes, while the right-hand side of the revoluble system is presenting a condition directly the opposite of this, the forward entrance to the light-passage on this side being closed to the entrance of light-rays from this side by the back of right positioned rhomboidal prism 9, the rear of the passage being without a ray-intercepting prism. A rotation of the reflecting system through 20 degrees of arc brings about a reversal of the condition shown, the conditions on the right-hand side of the system being precisely those just described for the left-hand side, with a similar treatment undergone by the infinite ray entering this side, and these changes of conditions occurring in alteration and at will and at regularly recurring intervals.

For finite distances, the refractive elements 21, 22 and 23, 24 are adjusted in such measure and simultaneously, through the operation of the knurled knob 41, and connecting gear, as to bring about such a degree of refraction of the entering rays as to cause the images borne by these rays, after passage through the objective 49 and light-dividing element 42, to assume central positions upon the two right-angularly arranged image-planes and to retain, for the images recorded upon the moving film, positions in vertical alignment.

Of the two identical image-planes thus provided, it is apparent that either may be made to serve for photographic purposes, though the right-angularly disposed one has been employed in the present construction.

The double image-plane is an absolute necessity in apparatus designed to record images from spaced view-points in alternation and in perfect vertical alignment upon a continuously moving film, as only through such provisions as are thus provided is it possible to have the field under observation while it is being photographed and to bring about that adjustment of images, through refractive agency, necessary to their perfect vertical alignment. Furthermore, it is the only construction possible permitting in simple and practical form the application of more than two of the primary colors in the production of pictures in colors and assigning to each color used an area equalling that of its area as represented in the spectrum.

Having thus described my invention, I claim, and desire to secure by Letters Patent:

1. In a stereo-cinematographic apparatus, a revoluble reflective system, duplicate pairs of spaced prismatic refractors cooperating therewith, and means for simultaneously adjusting the refracting power of said pairs according to the degree of refraction to be undergone by the rays of light passing therethrough.

2. In a cinematographic apparatus, a plurality of rhomboidal reflective units each comprising two oppositely disposed rhomboidal prisms having their entrant faces spaced and in different planes and their upper and lower surfaces fashioned to lie between planes at an angular inclination to each other of less than forty-five degrees and their emergent faces inclined from each other at an angle greater than a right angle and included between vertical parallel planes, said units being annularly arranged, the said prisms being adapted to function alternately.

3. In a cinematographic apparatus, a revoluble reflective system comprised of a predetermined number of rhomboidal prism units oppositely and alternately disposed and contiguously and annularly arranged, said system revolving as a unit and a ray-filter circumferentially borne thereby and in association therewith, the said filter being constituted of a central portion bearing sections of different colors and provided with opaque borders carrying transparent indicia marking the boundaries of the said colors.

4. In a cinematographic apparatus, a revoluble reflective system comprised of a selected number of rhomboidal prisms oppositely and alternately disposed and contiguously and annularly arranged, a ray-filter associatively borne thereby, an objective arranged and adapted to receive the light as reflected by the prisms constituting said revoluble system, a light-dividing means in association with said objective, a film and an ocular in co-operative relation with said light-dividing means, said light-dividing means being adapted to receive and divide the light entering therein directing one portion to said film and another portion to said ocular.

5. In a cinematographic apparatus, a revoluble light-reflecting system constituted of an even number of rhomboidal prism elements, said number being of such character as to be resolvable into an odd number of pairs, both elements and pairs being of opposite disposition and annularly and contiguously arranged and revoluble about a common axis, and adapted for the alternate direction of light as received through spaced apertures into an objective arranged for co-operative association therewith, a reflective element co-operating with said objective to direct the light to a film in association with said reflective element.

6. In a stereocinematographic apparatus, duplicate spaced refractive elements, each consisting of two prismatic wedge-shaped discs rotatable in opposite directions, as to pairs, about a common axis, and contrariwise directions, as duplicate elements, about parallel axes, and an objective common to said duplicate refractive elements.

7. In a stereocinematographic apparatus, duplicate spaced refractive elements, each consisting of two prismatic discs rotatable in opposite directions, as to pairs, about a common axis, and contrariwise directions as duplicate elements, means for the simultaneous adjustment of said refractive elements relative to the degree of refraction required, and an objective common to and in association with both of said duplicate refractive elements.

8. In a stereocinematographic apparatus including a film, duplicate spaced refractive elements, a revoluble light-reflecting system co-operating with said refractive elements, a single objective disposed for coactive association with said refractive elements through said revoluble light-reflecting system, a reflective element coactively associated with said objective and the film, and means for imparting synchronized movement to both said reflecting system and said film, to cause said film to move at double the angular velocity of said reflecting system.

9. In a cinematographic apparatus, spaced duplicate refractive elements, means for the adjustment of said elements to vary the degree of refraction, a revoluble light-reflecting system comprising an odd number of pairs of reflective elements each constituted of two double-reflecting prisms of rhomboidal type, the prisms as assembled being of opposite disposition relative to each other and annularly and contiguously arranged, a ray-filter borne by said revoluble reflecting system and adapted for recording upon a film pictures in colors corresponding to the colors borne by said ray-filter, an optical system arranged for co-operation association with said revoluble system and said ray-filter, the said optical system being comprised of a single objective, a light-dividing element an an ocular.

10. In a cinematographic apparatus, a revoluble light-reflecting system consisting of a plurality of double-reflecting units annularly, contiguously and oppositely arranged, the said units consisting of a pair of rhomboidal prisms arranged side by side contiguously and oppositely disposed.

11. In a stereocinematographic apparatus, a revoluble light-reflecting system comprising an odd number of units, each of said units consisting of a pair of rhomboidal prism elements, the elements of each pair being opposed with their emergent faces disposed in a series of planes constituting the circumference of the system, whereby the emergent light is directed radially of the system.

12. In a stereocinematographic apparatus, a revoluble reflecting system consisting of an odd number of double-reflecting units contiguously and annularly arranged and of opposed disposition, and a ray-filter cooperating with said reflecting system and constituted of a plurality of sections of different colors arranged in color areas proportionate to the dispersive values of the spectrum colors and in sequence corresponding thereto.

13. In a stereocinematographic apparatus, a film-guide, a film carried by said guide, said film-guide consisting of a transparent element having an opaque section, an exposure aperature in said element, and marginal transparent strips arranged at the sides of said opaque sections and adapted to admit light to the margin of said film to photographically record thereon indicia, as it passes over said guide element.

14. In a cinematographic apparatus, a revoluble reflective system consisting of an odd number of rhomboidal prism units contiguously and annularly arranged and of opposed disposition, and a ray-filter cooperating with said system and constituted of a plurality of sections of different colors arranged in color areas proportionate to the dispersive values of the spectrum colors and in sequence corresponding thereto.

15. In a cinematographic apparatus, a ray-filter comprising a transparent band bearing color sections corresponding to the spectrum, both as to sequential arrangement of colors and to the areas being proportionate to dispersive values thereof, and provided with opaque marginal strips carrying transparent indicia marking the boundaries of the different colors.

16. In a cinematographic apparatus, a film-guide consisting of a transparent arcuate element, an exposure aperture in said element having adjacent opaque picture-framing sections and marginal transparent strips adapted for the passage of light-rays for photographically recording indicia upon the film margin, and means for drawing a film over the arcuate surface of said element and holding it in contact therewith in its passage thereover.

17. In association, in a cinematographic apparatus, a ray-filter comprising a transparent band bearing color areas corresponding to the normal spectrum, both as to sequential arrangement of colors and to the areas being proportionate to the dispersive values thereof, and provided with opaque marginal strips carrying transparent indicia marking the boundaries of the different colors, and a film-guide consisting of a transparent arcuate element having an exposure aperture therethrough provided with adjacent opaque sections and transparent marginal strips.

In testimony whereof I have affixed my signature.

GRAVES GRIFFITH.